Figure 1:
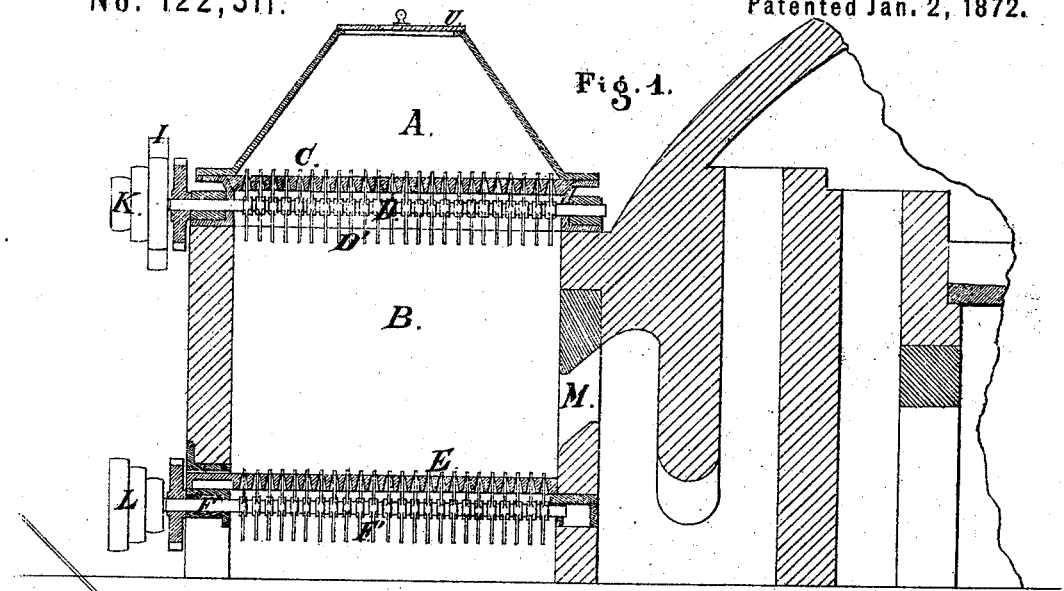
Figure 2:
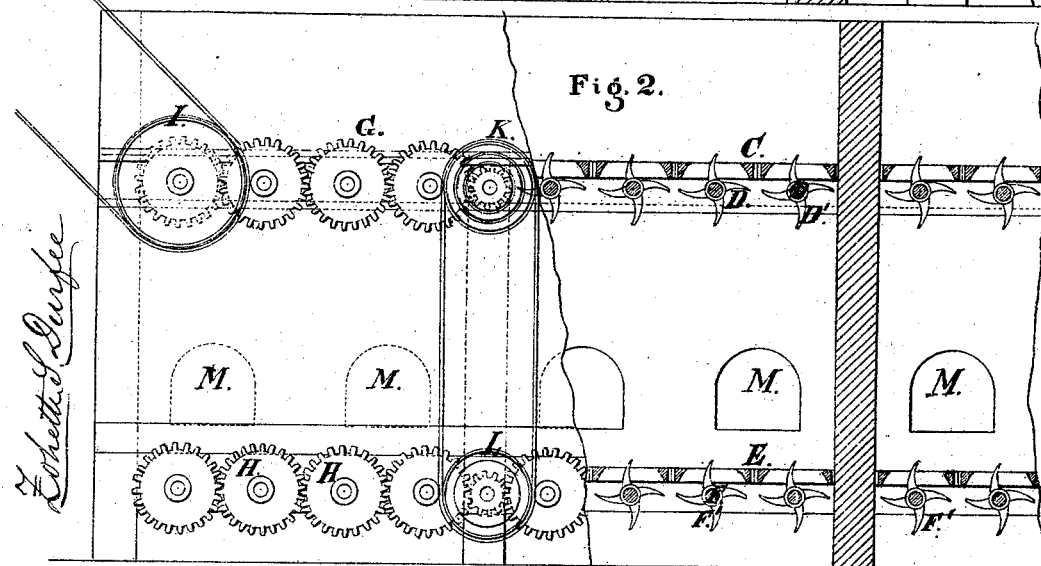
Figure 3:
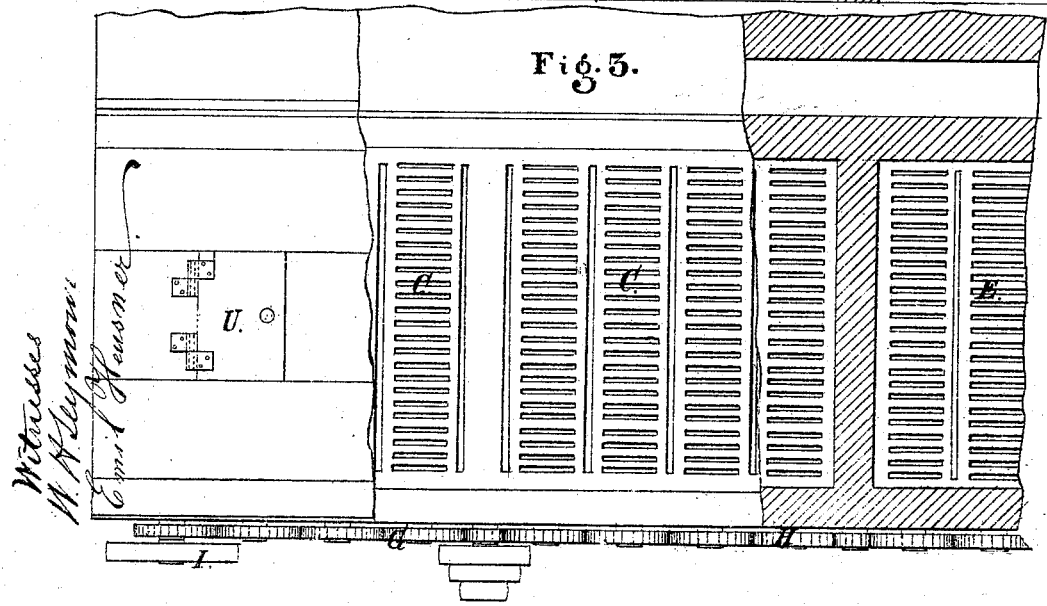

Z. S. DURFEE.
Improved Gas Generator.

No. 122,311.

3 Sheets--Sheet 1.

Patented Jan. 2, 1872.

Z. S. DURFEE.
Improved Gas Generator.

No. 122,311.

3 Sheets--Sheet 2.

Patented Jan. 2, 1872.

Z. S. DURFEE.
Improved Gas Generator.

No. 122,311.

3 Sheets--Sheet 3.

Patented Jan. 2, 1872.

UNITED STATES PATENT OFFICE.

ZOHETH S. DURFEE, OF NEW YORK, N. Y.

IMPROVEMENT IN GAS-GENERATING APPARATUS.

Specification forming part of Letters Patent No. 122,311, dated January 2, 1872; antedated December 16, 1871.

I, ZOHETH S. DURFEE, of the city, county, and State of New York, have invented certain Improvements in Apparatus for Generating Gas from Fuel in a more or less pulverized or comminuted state, such as the slack of anthracite coal; and I declare the nature of said invention to be as follows, reference being had to the accompanying drawing:

I arrange a fuel-chamber and feeding apparatus in connection with a furnace and the grates or apparatus, in and upon which the fuel is to be decomposed, in such wise that the fuel shall be fed regularly and mechanically over the whole surface of the grates in the furnace, and that the ashes resulting from the decomposition shall be regularly and mechanically removed, the fuel upon the grates being kept at any desired depth.

On Sheet I of the drawing, A is the feeding-chamber, at the bottom of which are grates C C C, beneath which is a series of shafts, D D, carrying picks D' D', these shafts being driven by the gears G G G, which mesh into each other, and are themselves driven by the pulley or gear I, set in motion in any convenient manner. The picks D' D' work up through the openings in the grates C C and cause the fuel thereon to descend in a continuous shower into the furnace B upon the grates E E, which are constructed like the grates C C, and have a corresponding series of picks, F' F', operating like the picks D' D', and rotating with the shafting F F F driven by gears H H, which are set in motion by cone-pulleys K and L fixed respectively upon one of the shafts D and F, as shown. The picks F' F' are for removing the ashes produced in the decomposition of the fuel on the grates E E, and by the use of the cone-pulleys the speed of the picks F' F' can be regulated so that it will be in proper relation to the speed of D' D', which deliver the fuel. Air is supplied beneath the grates E E by blast or draught, as may be desired; but I prefer to work the furnace or generator by draught, so regulated as that none of the fuel used will be carried off with the gases developed. The feeding-chamber A has a series of doors, U U, by which the fuel is introduced, and its construction and the connection of the grates and shafting with the chamber will be readily seen in the drawing. The gases produced are let off by flues M M in the rear walls of the furnace. In this drawing the gas-generating apparatus is shown in immediate connection with a reverberatory furnace only partly indicated, but the gas can be taken off by pipes or flues to be burned anywhere; or the apparatus may be attached to furnaces of any description. In lieu of the arrangement just described for feeding the fuel and removing the ashes a series of picks may be fixed vertically on the shafts D D and F F, and be made to project up into the fuel or ashes on the respective grates, and be operated by a reciprocating movement imparted to the shafts D D and F F in any of the common plans for imparting such movement. The grates C C and E E may also be constructed so as to have a partial rotation, or be moved to and fro in a horizontal plane by suitable machinery so as to sift out the fuel and ashes; and either of these plans may be applied to one of the grates and another to the other grate. The shafts D D and F F may also be made to carry chain-wheels, on which short endless chain-belts may be worked by each alternate pair of shafts so as to deliver both the fuel and ashes. The shafts D D and F F may also be corrugated in the direction of their length, or carry teeth upon them which nearly mesh into each other, and take the fuel and ashes down by their revolution; or they may carry toothed wheels which mesh and interlock with each other, the shafts and wheels in such cases constituting the grates.

Figure 13:
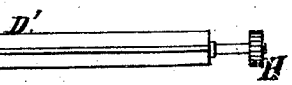
Figure 13:
Figure 12:
Figure 12:
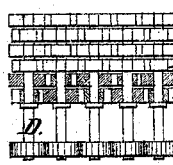
Figure 4:
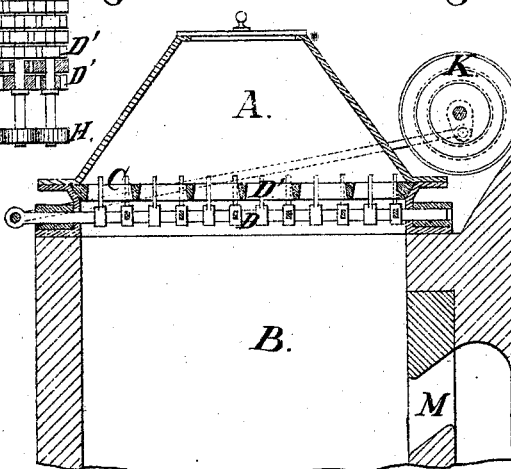
Figure 5:
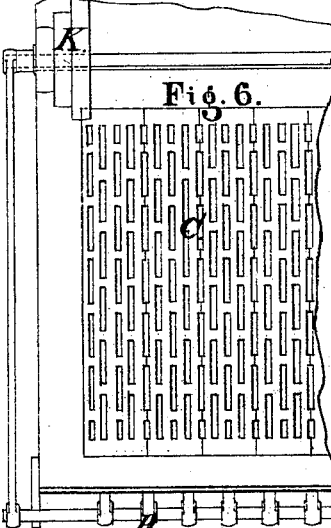
Figure 6:
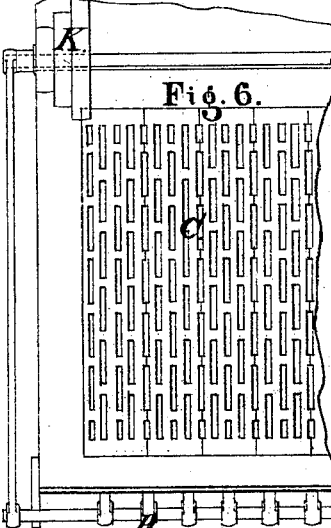
Figure 7:
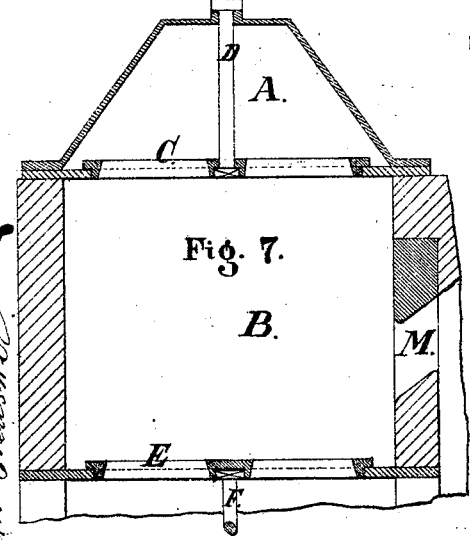
Figure 8:
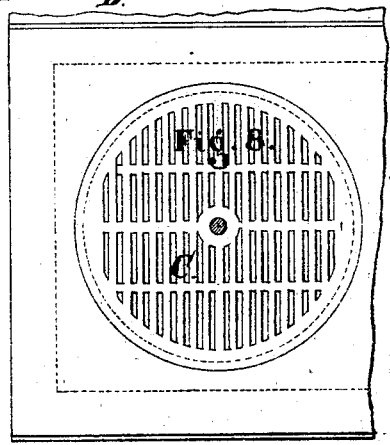

On Plate II I show some of the last-named plans of working my gas-generators, Figs. 4, 5, and 6 showing partial vertical and transverse sections and a partial elevation of one plan; Figs. 7 and 8, a partial vertical section and plan of another; and Figs. 12 and 13, details of other plans. In Figs. 4, 5, and 6 the picks D' are reciprocated on the shaft D by means of a connecting-rod and crank worked by the pulley K, the picks projecting through the grates C C, a like arrangement being made at the bottom of the furnace for working the grates on which the fuel is burned. In Figs. 7 and 8 the grates are given a partial rotation in a horizontal plane. No illustration is given of reciprocating grates, as their construction will be easily understood. Fig. 12 shows an arrangement whereby small toothed gears, revolving with the shafts D D just clear of each other, may be substituted for the grates hereinbefore described; and Fig. 13 shows another plan similar to the last, in which the shafts D D have ribs cast lengthwise upon them, and are arranged so that they deliver both fuel and ashes automatically.

Figure 9:
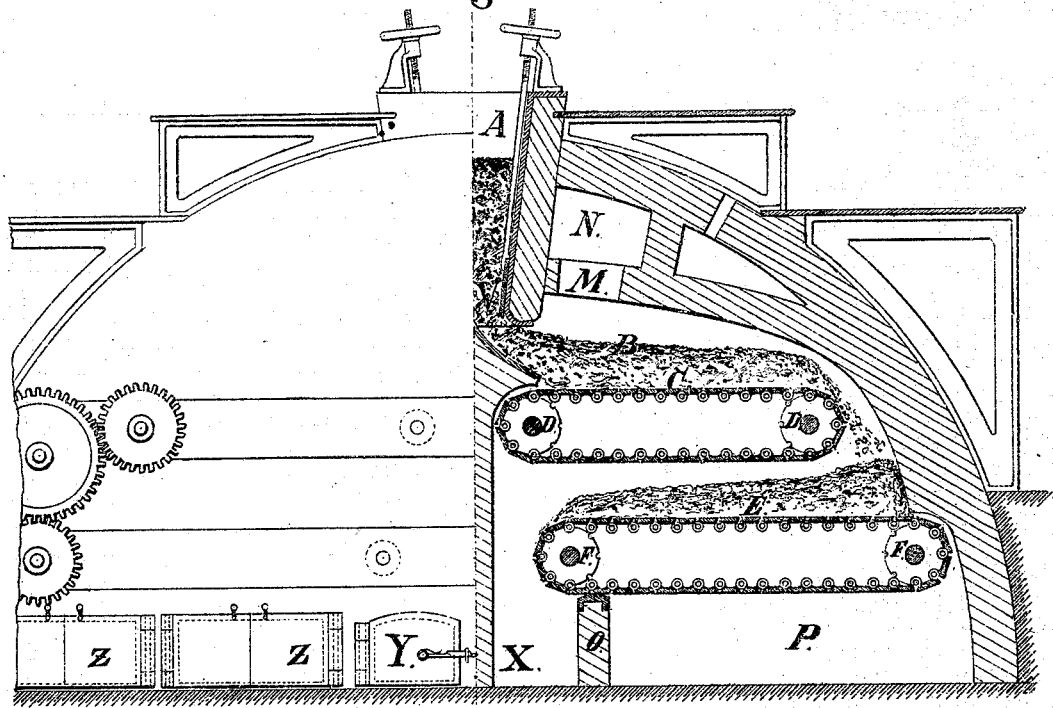
Figure 10:
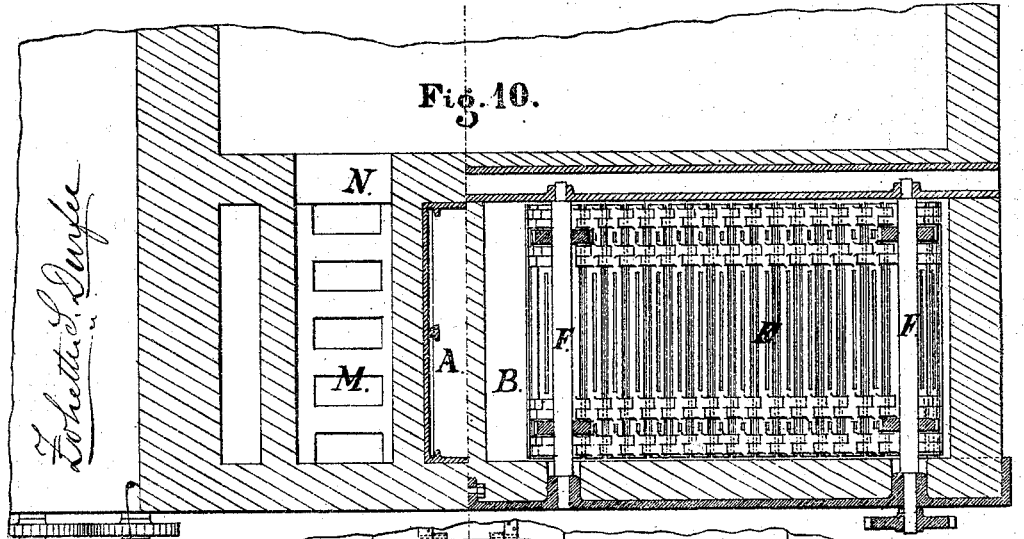
Figure 11:
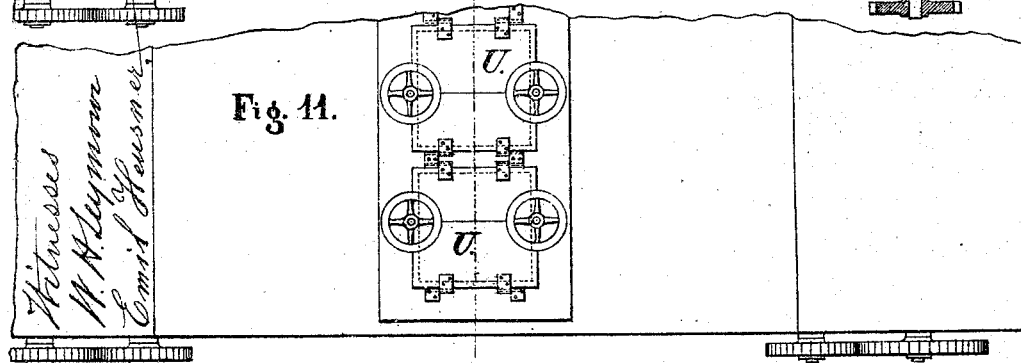

On Plate III I show another arrangement for working my gas-generator, Fig. 9 being a partial elevation and partial vertical section; Fig. 10, a partial transverse section; and Fig. 11, a partial plan of the top, showing the feeding-doors. In these figures, A is the fuel-chamber; B, the furnace or generator; C, the upper, and E, the lower grate. The fuel is fed from the chamber A upon the grate C, its thickness on the grate being regulated by sliding valves V worked by screws and hand-wheels, or in any convenient manner. The grates C and E are endless chain-belts driven by suitable gearing, the speed of which may be regulated as may be found desirable.

The operation of the generator is as follows: The fuel fed upon the grate C is carried thereon across the generator and delivered upon the grate E, by which it is carried back again; and having in mean time been deprived of all its combustible elements by the air forced or admitted into the chamber P and up through the grates, the ashes and refuse matters resulting from its decomposition are deposited in the chamber X. The space between the grates E and C and the depth of the fuel on the grates should be such that no air or gases can pass up between them and out at M without being properly carburized. The lower half of the grate C will, of course, become considerably heated as it passes over the fire on E; but this heat will serve to ignite the fuel fed in at V as it is taken along by the successive bars of C, and so assist in developing the gas required. The gases produced pass up through flues M into a flue, N, leading to the main gas-flue, or to any furnace in which the gas is to be consumed. There is an iron plate at the top of the division-wall O which the grates E just touch in their passage, thus preventing much air from passing from P between the grates without having first passed up through the grates E. The chamber X is closed by a door as at Y, and the chamber P by similar doors Z Z. If necessary, the shafts D D and F F may be made hollow, and be kept cool by currents of water.

Having thus described my said improvements, what I claim is—

1. Gas-generators constructed with combined automatic feeding apparatus and automatic apparatus for clearing the grates, so that the fuel used shall be fed automatically in a continuous shower over the grates whereon it is to be decomposed, and that the ashes and refuse from such decomposition shall be automatically and regularly removed from these grates.

2. The various plans for accomplishing this purpose, substantially as described and shown on Plates I and II of the drawings herewith.

3. The gas-generators, substantially as shown on Plate III, for decomposing fuel on endless chain-grates.

Z. S. DURFEE,
(Or) ZOHETH S. DURFEE.

Witnesses:
W. H. SEYMOUR,
EMIL HEUSNER. (66)